US011102935B2

(12) United States Patent
Liefooghe et al.

(10) Patent No.: US 11,102,935 B2
(45) Date of Patent: Aug. 31, 2021

(54) INTELLIGENT BALING

(71) Applicant: CNH Industrial America LLC, New Holland, PA (US)

(72) Inventors: Dries Liefooghe, Alveringem (BE); Bram Rosseel, Snellegem (BE); Jeroen Devroe, Izegem (BE); Brecht Vermeulen, Kortrijk (BE); Thomas Debbaut, Ronsele (BE)

(73) Assignee: CNH Industrial America LLC, New Holland, PA (US)

(*) Notice: Subject to any disclaimer, the term of this patent is extended or adjusted under 35 U.S.C. 154(b) by 186 days.

(21) Appl. No.: 16/404,240

(22) Filed: May 6, 2019

(65) Prior Publication Data
US 2019/0364740 A1 Dec. 5, 2019

(30) Foreign Application Priority Data

May 4, 2018 (BE) .................................. 2018/5291

(51) Int. Cl.
*A01F 15/08* (2006.01)
*A01F 29/09* (2010.01)
*A01F 15/04* (2006.01)

(52) U.S. Cl.
CPC ............ *A01F 29/09* (2013.01); *A01F 15/042* (2013.01); *A01F 15/0825* (2013.01)

(58) Field of Classification Search
CPC .... A01F 29/09; A01F 15/042; A01F 15/0825; A01F 15/101

(Continued)

(56) References Cited

U.S. PATENT DOCUMENTS

2004/0187468 A1    9/2004  Krone et al.
2008/0141873 A1*   6/2008  Gerngross ............. B30B 9/3075
                                                        100/41
2018/0317394 A1*  11/2018  Benevelli .............. A01F 15/042

FOREIGN PATENT DOCUMENTS

EP          3078257 A1    10/2016
EP          3071014 B1     5/2018
(Continued)

OTHER PUBLICATIONS

Extended European Search Report for EP Application No. 19171151.4 dated Sep. 5, 2019 (seven pages).

Primary Examiner — Adam J Eiseman
Assistant Examiner — Chastin M Brundidge
(74) Attorney, Agent, or Firm — Peter Zacharias; Patrick Sheldrake

(57) ABSTRACT

An agricultural baler includes a baling chamber and a pre-compression chamber. The pre-compression chamber is configured to gather crop material and to periodically form a slice of the crop material and introduce the slice into the baling chamber. The baling chamber includes a plunger provided for moving in the baling chamber thereby compressing slices of crop material into a bale. The agricultural baler further includes multiple sensors and a controller configured for controlling operation of the agricultural baler based on inputs of the multiple sensors. A first subset of the multiple sensors is directly related to bale parameters, and a second subset of the multiple sensors is indirectly related to the bale parameters. The controller is configured to control the operation of the agricultural baler and calibrate the sensors of the second subset based on outputs of sensors of the first subset.

10 Claims, 2 Drawing Sheets

(58) Field of Classification Search
USPC .................................... 100/179, 188 R, 189
See application file for complete search history.

(56) References Cited

FOREIGN PATENT DOCUMENTS

| | | | |
|---|---|---|---|
| WO | 2013/045105 | A1 | 4/2013 |
| WO | 20130045105 | A1 | 4/2013 |
| WO | 2014/161773 | A1 | 10/2014 |
| WO | 2014161773 | A1 | 10/2014 |

* cited by examiner

INTELLIGENT BALING

FIELD OF THE INVENTION

The present invention relates to an agricultural baler. Desirably, the present invention relates to a square agricultural baler, which is provided for gathering crop material, forming slices of crop material from the gathered crop material, and pressing square bales from the slices.

BACKGROUND OF THE INVENTION

Agricultural balers typically comprise two main parts used in the formation of the bales, being a pre-compression chamber and a baling chamber. Crop material is gathered and pushed into the pre-compression chamber, where a slice of crop material is formed. Pre-compression chamber is linked to the baling chamber in such a manner that the slice of crop material can periodically be transferred into the baling chamber. In the baling chamber, a plunger reciprocally moves, thereby pressing a square bale from subsequently fed slices.

The plunger movement is powered via a main shaft driven by a motor. Thereby, the motor can be a part of the baler, or can be a part of the puller (tractor) connected to the baler via a power take-off (PTO). In practice, this reciprocal movement of the plunger is often considered the most dominant movement in the baler, dominant meaning that other movements are made relative to this movement of the plunger. The reason is that the plunger movement requires the highest force (highest relative to other forces needed for operating the baler). Of all movements in the baler, the plunger movement shows the highest inertia.

The pre-compression chamber is adapted for receiving gathered crop material. To this end, the pre-compression chamber has an inlet. The pre-compression chamber furthermore includes an outlet towards the baling chamber. Between the inlet and the outlet, a channel is defined in which crop material can gather into a slice of crop material. The pre-compression chamber comprises a slice pushing mechanism, so-called stuffer, provided for pushing a slice of crop material formed in the pre-compression chamber through the outlet of the pre-compression chamber into the baling chamber. The sliced crop material is typically pushed in a first segment of the baling chamber. First segment is typically located directly behind the plunger (the plunger being in the withdrawn position). Thereby the slice of crop material is pushed in the baling chamber, after which the plunger can propel the crop material into the baling chamber, thereby pushing the most recently entered slice into the baling chamber, making it a part of the square bale which is being formed.

The pre-compression chamber comprises, for the purpose of pushing the slice into the baling chamber, a slice pushing mechanism. Different types of slice pushing mechanisms are known, among which fingers grasping behind the slice and pushing the slice through the outlet, or a set of conveyer belts in between which the slice is formed, and which conveyer belts are driven to push the slice through the outlet.

The slice pushing mechanism is driven via a driving mechanism that is operationally linked to the plunger driving mechanism. A synchronized movement between the slice pushing mechanism and the plunger is needed to ensure a proper operation of the baler. Namely, only when the plunger is withdrawn, a slice can be pushed in the baling chamber. In practice, different synchronization types are possible among which a one/one synchronization, meaning that every withdrawal of the plunger a new slice is entered into the baling chamber, or a one/two synchronization, meaning that every other withdrawal of the plunger a new slice is entered, thus the plunger moves forth and back two times for each slice. Other synchronization timing such as one/three, one/four . . . are also possible.

Synchronization is in practice often realized by mechanically linking the plunger driving mechanism and the slice pushing driving mechanism. Such mechanical link ensures proper synchronization, as the slice pushing mechanism is mechanically driven by the plunger movement, it cannot move out of synchronization. The synchronization can be variable using known techniques so that the timing can be adapted, while still having a connection between the plunger driving mechanism and the slice pushing driving mechanism.

In practice, there is an inverse relationship between the quantity of bale material to be compressed on each compression stroke of the plunger and the maximum level of compression of the bale material and the density of the bale. If a large quantity of material is fed into the bale chamber this will result in a large slice thickness and a low level of compression, and therefore a low density. On the other hand, if a small quantity of bale material is fed into the bale chamber on each stroke this will result in a small wad thickness and a high maximum level of compression, and therefore a high density. As the throughput of the baling machine (that is, the rate in kg/hour at which material is compressed) depends on the amount of bale material compressed per stroke of the plunger, there is also an inverse relationship between the throughput of the baler and the density of the bale. The operator therefore has to choose either a high throughput and a low density, or a low throughput and a high density.

Another drawback in the operation of the known balers relates to so called top fill and so called left-right fill. Top fill and left-right fill are a measure for the uniformity of the slice after it has entered the first segment of the baling chamber. It will be recognized that a non uniform fill, for example where the lower part of the first segment is more dense than an upper part, or the left part of the first segment is more dense than the right part, results in an inferior bale. Such top fill has an effect that a bale is high dense at lower end, and not dense at the top, resulting in an unstable bale that is likely to show a substantial deviation from the ideal square form. A negative top fill also results in a substantial wear of the plunger and baling chamber, as forces are not equally transmitted. The plunger will feel a substantially higher resistance at the lower part of the plunger compared to the upper part resistance of the plunger. This will create a torque force exerted to the plunger which has to be borne by the plunger driving mechanism. When the ideal top fill can be obtained, a bale can be formed with nearly ideal outer dimensions and shape, and excessive wear on the baler mechanism can be avoided.

For the economical use of trucks for transporting the bales, bales of a high density are required. However, for fast processing of the bale material, a high throughput is required. This creates a dilemma for the operator, which has to compromise on the throughput of the baler and/or the bale density. With a prior art baler a higher density can only be achieved at high throughput by strengthening the gearbox or adding an additional drive means for driving the compressed bale material towards the outlet end of the channel during successive compression cycles of the plunger, which adds to the cost of the baler.

It is an object of the present invention to control the agricultural baler in a more optimal manner in particular during startup of the baler.

SUMMARY OF THE INVENTION

To this end, the invention provides an agricultural baler comprising a baling chamber and a pre-compression chamber, wherein the pre-compression chamber is adapted to gather crop material via a rotor and to periodically form a slice of said crop material and introduce the slice towards the baling chamber into a first segment of the baling chamber, the baling chamber comprising a plunger provided for reciprocally moving in the baling chamber thereby compressing slices of crop material into a bale, the baling chamber further comprising at least one movable wall, the agricultural baler further comprising multiple sensors and a controller adapted for controlling operation of the agricultural baler based on inputs of the multiple sensors, wherein a first subset of the multiple sensors is directly related to bale parameters and a second subset of the multiple sensors is indirectly related to said bale parameters, wherein the controller is configured to, in a first time period, control the operation of the agricultural baler and calibrate the sensors of the second subset based on outputs of sensors of the first subset.

The invention is based on the insight that the start-up procedure of an agricultural baler can be improved by controlling the baler primarily or solely based on a subset of sensors measuring parameters directly relating to the bale. It has been found that during start-up, an optimal value for sensors only indirectly measuring bale parameters can significantly vary depending on environmental and/or operational conditions. However, once an optimal output of these sensors is known, after calibration, the baler can be more accurately and faster controlled based on the sensors indirectly measuring bale parameters.

Bales are typically formed, and bale parameters can be measured at a back end of the agricultural baler. Only at the back end, the bale is finished and all parameters of the bale are measurable. Therefore, only at the back end, bale parameters such as width, height, weight, length, density and other bale parameters can be measured. During baling, when the baler would be controlled based on the parameters measured at the back end of the baler, a significant controlling retardation would be present and the controlling of the baler would be suboptimal. Therefore, the front end of the baler is also provided with multiple sensors measuring multiple aspects of the baling process. However, since no bale has been formed yet at the front end of the baler, these measurements are only indirectly related to the bale parameters.

It has been found that during start-up of the agricultural baler, the baler is desirably primarily controlled using a first subset of sensors directly measuring bale parameters. When a bale is formed with predetermined characteristics, a second subset of sensors is calibrated. The bale having the predetermined characteristic can easily be verified using the first subset of sensors since this first subset of sensors measures parameters directly relate to the bale. In other words, when an output of the first subset of the multiple sensors is within a predetermined range, the bales formed by the agricultural baler are considered to have predetermined characteristics. When this is achieved, the outputs of the second subset of the multiple sensors are recorded and desirably stored in a memory. Based on the recorded output, a target output or optimal output is set for each of the sensors in the second subset. The skilled person will understand that a predetermined range can also be set for each sensor around the target output or optimal output. In other words, the sensors in the second subset are calibrated. This allows to control the operation of the baler in a subsequent time period based on the calibrated second subset. In this context, calibration is defined as setting an optimal output or optimal output range for a sensor. Tests and simulations have shown that a baler can be more optimally controlled using the above described means and techniques.

Preferably, an estimation of optimal outputs is predetermined for the second subset of the multiple sensors, which estimation is used in the first time period for controlling the operation of the agricultural baler. In the first time period, optimal values for the second subset of the multiple sensors are not yet determined or measured, and can only be estimated. By providing an estimation for these sensors and by controlling the agricultural baler in the first time period, based on the estimation of optimal outputs, a further improved controlling of the baler can be realised. In this context, it is noted that the estimation of optimal outputs are marked as estimation so that the controller is aware that the output is only an estimated optimal output. After calibration, the optimal output is marked as calibrated optimal output so that the controller can recognize the difference and use the second subset of sensors differently when optimal outputs are estimated compared to when an optimal output is calibrated.

Desirably, the controller is configured to control the operation of the agricultural baler in a first time period until output of the first subset of the multiple sensors laid within a predetermined range, and to calibrate the sensors of the second subset of the multiple sensors after the first time period. The first time period relates to the start-up period of the agricultural baler. Start-up is considered finished when at least one bale has been produced with predetermined characteristics. The predetermined characteristics are directly measured by the first subset of the multiple sensors. Hence, when the first subset of the multiple sensors show an output within a predetermined range, it may be concluded that a correct bale is formed. When that happens, start-up is finished hence the first time period ends. Then, the second subset of the multiple parameters are calibrated so that further operation of the baler can be controlled primarily using the second subset of the sensors. The majority of these second subset sensors are located, as explained above, in a front segment of the agricultural baler. By controlling the operation of the baler based on measurements in this front section, controlling retardation is minimised and the baler can be controlled faster.

Preferably, the controller is adapted to prioritise the first subset of the multiple sensors during the first time period, and to prioritise the second subset of the multiple sensors in a subsequent time period. Further desirably, the subsequent time period begins only after the outputs of the first subset of multiple sensors lay within a first predetermined range. In this context, to prioritise means that the weight or influence of a sensor output is considered more important than a non-prioritised sensor output. This means that in the first time period, all sensors can be used to control the agricultural baler. However, in the first time period, the weight or influence of the output of the first subset of multiple sensors is higher than the weight or influence of outputs of the second subset of the multiple sensors. This changes after the first time period has ended. In a subsequent time period, the weight or influence of the output of the second subset of the multiple sensors becomes higher.

Desirably, the first subset of the multiple sensors is adapted to output a value directly related to at least one parameter chosen from weight, density, shape, length, width and height. These parameters directly relate to the bale parameters. An example of a sensor of which an output is directly related to a bale length is the star wheel rotation. An example of a sensor of which an output directly relates to a width or height of the bale is the position sensor of the at least one movable wall. At the back end of the agricultural vehicle, weighing means can be provided to determine the weight of the bale. These are examples of sensors that directly measure a bale parameter such as weight, shape, length, width and height. The skilled person will realize that other sensors could also directly related to these parameters and can therefore be part of the first subset.

Preferably, the majority of sensors in the first subset of the multiple sensors are located in a rear section of the agricultural baler. Further desirably, the majority of sensors in the second subset of the multiple sensors are located in a front section of the agricultural baler. Hence, when in a first time period the first subset of sensors is used to control the baler, the baler is controlled based on measurements at the rear end of the agricultural baler, where the bale has at least partially been formed. This has been found to be optimal in a start-up situation, where environmental and/or operational conditions significantly influence an optimal output of the sensors in the second subset. Since the outputs of the first subset directly relate to bale parameters, these outputs are significantly less influenced by environmental and/or operational parameters. Therefore during start-up it has proven to be an advantage to operate the baler primarily based on sensors in the first subset. However, since the majority of the sensors is located at the rear end of the agricultural baler, there is a disadvantage in the form of a retardation when baler operation is only controlled based on the first subset. The second subset is provided in a front section of the agricultural baler, and can only be optimally used after calibration. Therefore the second subset is prioritised only after the first time period has ended.

Preferably, operation of the agricultural baler is controlled by a controller using an algorithm stored in a memory operationally connected to the controller, the algorithm comprises factors for outputs of each of the multiple sensors, and wherein the factors relating to the second subset increase from the first time period to a subsequent time period. By increasing the factors relating to the second subset, the influence or weight of the outputs of the second subset is increased after the first time period.

Preferably, the controller is operationally connected to a memory storing a set of rules for operating the agricultural baler based on outputs of the multiple sensors, wherein a selection of the set of rules is assigned to the first time period. By assigning a selection of the set of rules to a first time period, these selected rules can be used during the first time period to operate the baler. After the first time period has ended, other rules can be used.

BRIEF DESCRIPTION OF THE DRAWINGS

Some embodiments of apparatus and/or methods in accordance with embodiments of the present invention are now described, by way of example only, and with reference to the accompanying drawings, in which.

DETAILED DESCRIPTION OF THE DRAWINGS

Figure 1:
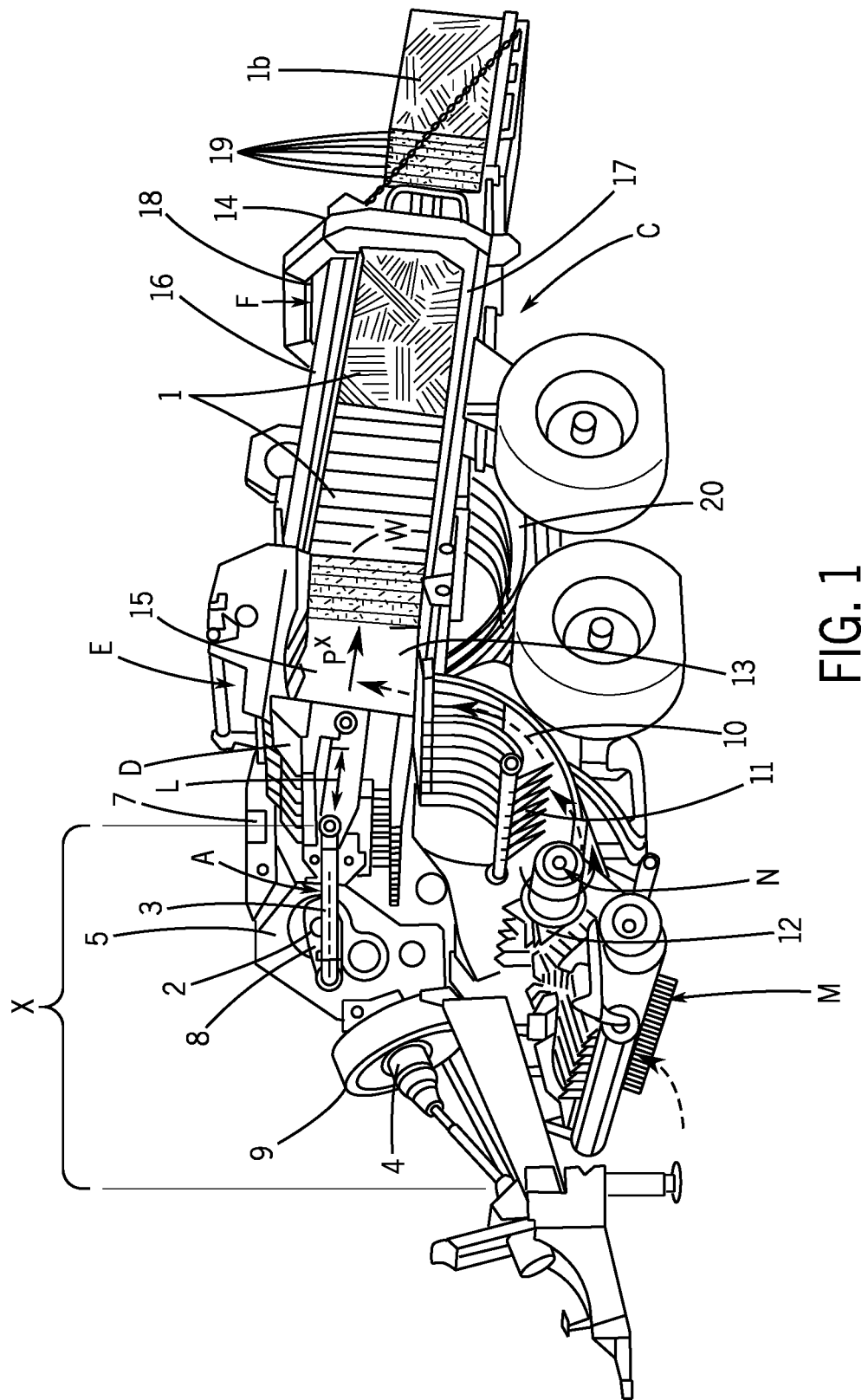
FIG. 1 illustrates a baler according to an embodiment of the invention.

The prior art baling machine or baler shown in FIG. 1 is configured to be pulled over a field and driven by a tractor (not shown). Alternatively, the baler could be self-propelled and/or self-driven.

The baler includes a baling chamber C and a plunger D that can be driven into the baling chamber C in a reciprocating manner. The baling machine also includes a pick up mechanism M for picking up cut bale material such as grass and straw from the ground, a feed mechanism N for feeding the bale material into the baling chamber C and a driveline X for transmitting drive to the plunger D from the drive output of a towing vehicle (not shown). These components are all conventional and are not described in further detail. The baling machine also includes a binding device E for binding the bale with binding twine. This binding device may be any conventional binding device and is therefore not described in further detail.

The baling chamber C comprises an open ended bale-forming channel A through which compressed bale material 1 is forced by the reciprocating plunger D. In this example, the plunger D is driven from a rotating drive axle 2 via a crank 8 and the plunger rod 3. The drive axle 2 comprises an output shaft of a drive gearbox 5 that also has a driven input shaft 4 through which it receives drive from the drive output of a towing vehicle (not shown). The gearbox 5 is mounted on a frame 7 of the baling machine. The drive input shaft carries a large flywheel 9 for smooth operation of the baler.

Typically the material to be baled is taken up from the ground by the pick-up device M. The feed device N feeds the material to an intermediate material buffer 10. The feed device N may be equipped with knives 12 for cutting up the material to be baled. When sufficient material has collected in the intermediate buffer 10, a stuffer 11 forwards the material into the bale chamber C in front of the plunger D. The material is then ready to be compressed.

The open ended channel A that forms the baling chamber C has an inlet end 13 and an outlet end 14. The bale-forming channel A is defined by two side panels 15 (one of which has been omitted in FIG. 1 to show the interior of the baling chamber C), a top panel 16 and a bottom panel 17. The top panel 16 (and/or one or both of the side panels 15) may comprise an adjustable panel that is pivotable about its upstream end allowing the cross-sectional area of the bale-forming channel A to be adjusted. An adjusting mechanism 18 for adjusting the position of the adjustable panel 16 is provided towards the outlet end 14 of the baling chamber C. The adjusting mechanism 18 applies a biasing force F to the adjustable panel 16, to control the level of friction between the panel and the compressed material 1 in the baling chamber C. The adjustable panel 16 thus comprises a friction control element.

The plunger D is driven in a substantially linear direction L in the longitudinal direction of the baling chamber between two end positions comprising respectively a withdrawn position (FIG. 2) in front of the baling chamber C and an extended position (FIG. 4) in which it extends into the channel A of the baling chamber C. When the plunger is in the withdrawn position (FIG. 2) the baling chamber C is loaded with the bale material to be compressed. The plunger D is then driven into the baling chamber so that this new bale material is first shifted into contact with a body of compressed material 1 already in the baling chamber C and then compressed against that body of material. The newly compacted material forms a wad W that is added to the already compacted material 1 in the channel A. The friction of the compressed material 1 with the panels 15, 16, 17 of the baling chamber C provides a resistive force allowing for compression of the new material that is introduced into the baling chamber C in front of the plunger D. Each of the panels 15, 16 and 17 may comprise an adjustable panel allowing the cross-sectional area of the bale-forming channel A to be adjusted. Alternatively, the complete panels 15, 16 and 17 are adjustable and pivotally connected to a baler frame allowing the cross-sectional area of the bale-forming channel A to be adjusted. In both situations, these panels 15, 16 and 17 can be considered as movable wall. Via these movable walls, friction can be controlled.

After compression, continued movement of the plunger D drives the wad W of newly compressed material and the compressed material 1 already in the baling chamber C towards the outlet end 14 of the baling chamber until the plunger D reaches its fully extended end position. The plunger D then returns in the opposite direction to its withdrawn position so that the baling chamber C can be reloaded with new material to be compressed. The plunger therefore performs a compression cycle that consists of a compression stroke followed by a return stroke. This compression cycle is repeated continuously until the baling process is finished.

A bale 1b is formed from the compressed material in the baling chamber and bound with twines 19 that are looped around the body of compressed material in order to hold it in compression after leaving the baling machine. This binding process can be performed as follows.

At the start of the baling process two lengths of twine from spools (not shown) on opposite sides of the baling chamber C are connected to one another by tying the ends of the twines together using the binding device (or knotter) E. As the bale material is compacted in the baling chamber C the spools feed twine to the baling chamber C on either side of the bale material. On one side of the baling chamber C the twine passes through the tip of a baling needle 20. When the body of compressed bale material 1 has reached its full length, between two successive compressing strokes, the needle 20 brings the twine as a loop to the other side of the baling chamber C. The knotter E then knots the twine, joining an end of the twine loop that was brought around the compressed bale by the needle 20 to an end of the twine that was supplied by the spool on other side of the baling chamber (the same side as the knotter device E). The needle 20 is then retracted and a new bale is started.

Multiple sensors are distributed through the agricultural baler to control different aspects of the operation of the baler. In the end, since the baler produces bales, all operating parameters relate to the bale making process in one or another way. However, some sensors directly measure bale parameters while other sensors measure aspects indirectly relating to the bale characteristics. Examples are given hereunder of multiple sensors, which are merely given for better understanding of the present invention. The sensors mentioned are not exhaustive and are therefore not limiting for the invention.

The front end of the intermediate material buffer 10 typically comprises a rotor for picking up the swath of crop material from the field. This rotor can be provided with sensors, for example speed and/or torque sensors that give an indication on the amount of swath that is picked up from the field. It will be clear for the skilled person that this sensor output does not directly relate to bale characteristics. For example, the moisture content in the swath or in the crop material could significantly influence the output of the rotor sensor while not or not significantly affecting the bale characteristics. This sensor output could be taken in combination with other sensor outputs to control aspects of the baling process.

Sensors can be provided at sides of the pre-compression chamber 10. These sensors can detect the presence and/or density of crop material in the pre-baling chamer 10. Based on the output of these sensors, the stuffer can be controlled. The skilled person will understand that output of these sensors in the sides of the pre-compression chamber 10 do not directly relate to bale characteristics. These sensors are used to control aspects of the baling process. The sensors at the sides of the pre-compression chamber relate to crop material presence sensors, or can relate to position sensors of side elements of the pre-compression chamber 10.

At the pre-compression chamber 10, straw hook sensors can be provided. Straw hook sensors provide an indication of the top fill and left-right fill. Therefore, the skilled person will be able to control the operation of the agricultural baler based on an output of the sensors. However, it will be clear that these sensors do not directly output bale characteristics.

The top wall of the inlet end 13 of the baling chamber, and optionally also the side walls are provided with multiple sensors. These sensors measure the presence of crop material in this inlet end when the stuffer stuffs the pre-compressed crop material into the baling chamber. These sensors can be mechanic sensors, optic sensors, ultrasonic sensors. These sensors can measure the presence of crop material, but also the timing at which crop material arrives so that an indication of top fill or left-right fill can be obtained. These sensors can be used to optimize the operation of the agricultural baler. The output of these sensors are indirectly related to the shape of the bale. However, environmental parameters could influence the optimal output of these sensors to obtain a bale with a predetermined shape. Therefore, outputs of these sensors are considered indirectly related to bale characteristics.

The plunger D can be provided with multiple sensors to measure the pressure exerted by the plunger to the crop material. Outputs of these sensors relate to the density of the agricultural baler and however, environmental and operational settings could influence optimal outputs of these plunger sensors, so that these sensors are considered to indirectly relate to bale characteristics. Plunger sensors could comprise sensors in the surface of the plunger facing the baling chamber, wherein multiple sensors measure the pressure applied to the crop material. Furthermore, plunger sensors can be provided in the plunger drive mechanism, plunger tilt could be measured.

A star wheel is provided for triggering the needle 20 and twine 19 mechanism. The star wheel is typically provided at a top of the baling chamber, somewhere in the center of the baling chamber. The star wheel is a wheel in the form of a star, having pins that press into the bale and when the bale is propelled through the baling chamber, the star wheel rotates. Thereby, the output of the star wheel directly relates to a length of the bale. Hence, the star wheel directly measures a characteristic relating to the bale. Another function of the star wheel might be measuring the density of the bale. Since the star wheel comprises multiple pins at the periphery of the wheel, the depth with which the star wheel can enter the compressed material 1 when a predetermined pressure is applied is a direct indication of the density of the bale. Hence, the star wheel could output values which directly relate to these two characteristics of the bale.

The baling chamber comprises one or multiple moveable walls, for example the side panels 15 and the top panel 16. These moveable walls can be provided with sensors. One of the sensors is typically a position sensor wherein the position of the top wall and the position of the side walls is measured. The position of the top wall directly relates to the height of the bale while the position of the side walls directly relates to the width of the bale. These sensors are typically provided at a rear segment of the baling chamber.

During start-up of the agricultural baler, the baler is desirably controlled using the sensors directly measuring bale characteristics. As is clear from the explanation above, these sensors are provided at a rear segment of the agricultural baler. Since these sensors measure characteristics directly relating to the bale, optimal sensor outputs of these sensors are not influenced by environmental or operational conditions. When a bale is formed with characteristics within a predetermined range, other sensors indirectly measuring bale characteristics can be calibrated. After calibration, the agricultural baler can be controlled optimally.

Figure 2:
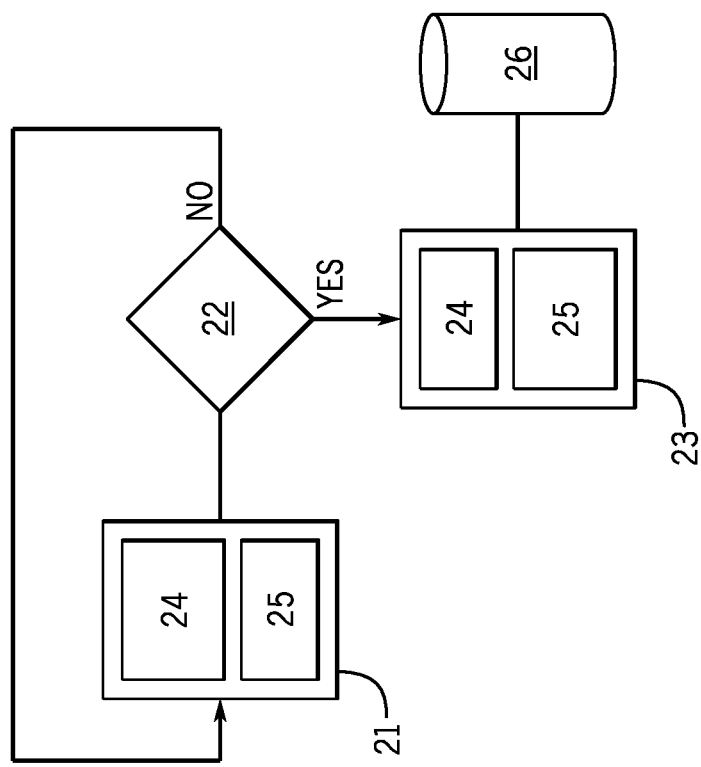
FIG. 2 shows a scheme for controlling a baler according to an embodiment of the invention.

FIG. 2 shows a scheme for operating the baler. In the figure, the controller 21 illustrates the controller in a startup state. The figure shows a large and a small field, relating to the first subset of sensors 24 and the second subset of sensors 25 respectively. In this state of the controller 21, the controller prioritizes the first subset of sensors 24 when controlling the baler. The second subset of sensors 25 can also be used to control the baler in the startup state, however the importance of the first subset 24 is higher.

FIG. 2 further shows a comparing element 22 which compares an output of the first subset of sensors 24 to a predetermined value or range. This comparing element 22 determines whether the bale is formed with predetermined characteristics. Since the first subset of sensors 24 output values directly related to the bale characteristics, such comparison can be easily made. If the bale is not within the predetermined range, the baler is operated using the controller 21 in the first state.

FIG. 2 shows that if the comparing element 22 determines that the bale characteristics comply to predetermined settings, the controller 23 is used to control the baler. In practice, the controller 23 and the controller 21 can be the same element, but with different settings. To illustrate the difference, FIG. 2 shows two controllers 21 and 23. Controller 21 is in the startup state and controller 23 is in the subsequent state. The controller 23 also shows a large and a small field, relating to the second subset of sensors 25 and the first subset of sensors 24. This is the other way around compared to controller 21. Hence the skilled person will realize that the second subset of sensors 25 is given a higher weight in the controlling of the baler. A database or memory 26 is operationally connected to the controller 23. This memory stores the optimal values or optimal ranges of the second subset of sensors 25. These optimal values or optimal ranges are desirably recorded or stored in the memory 26 only after the comparing element 22 determines that the outputs of the sensors in the first subset 24 lay within a predetermined range. At that moment, the startup of the baler is complete and the second subset of sensors can be calibrated. In the embodiment of FIG. 2, the calibration means that the sensor outputs of the second subset of sensors are recorded or stored in the memory 26.

Based on the figures and the description, the skilled person will be able to understand the operation and advantages of the invention as well as different embodiments thereof. It is however noted that the description and figures are merely intended for understanding the invention, and not for limiting the invention to certain embodiments or examples used therein. Therefore it is emphasized that the scope of the invention will only be defined in the claims.

The invention claimed is:

1. An agricultural baler comprising:
   a baling chamber comprising:
      a plunger for reciprocally moving in the baling chamber thereby compressing slices of crop material into a bale; and
      at least one movable wall for adjusting the cross-sectional area of the baling chamber;
   a pre-compression chamber configured to gather crop material and to periodically form a slice of the crop material, the pre-compression chamber comprising a stuffer for introducing the slice towards the baling chamber into a first segment of the baling chamber;
   multiple sensors comprising a first subset of sensors for directly measuring bale parameters and a second subset of sensors for measuring items indirectly related to the bale parameters; and
   a controller configured for controlling operation of the agricultural baler, wherein operation of the agricultural baler comprises the steps of:
      synchronizing of the stuffer and the plunger;
      adjusting the position of the at least one movable wall, based on inputs of the multiple sensors;
      forming the crop material into the bale; and
      calibrating of the second subset of sensors based on outputs of the first subset of sensors in a first time period in order to optimize control of the baler in subsequent time periods.

2. The agricultural baler of claim 1, wherein the operation of the baler further comprises the step of predetermining an estimation of optimal outputs for the second subset of sensors, which estimation is used in the first time period for controlling the operation of the agricultural baler.

3. The agricultural baler of claim 1, wherein the operation of the baler further comprises the step of controlling the operation of the agricultural baler in a first time period until outputs of the first subset of sensors lay within a first predetermined range, and to calibrate the second subset of sensors after the first time period.

4. The agricultural baler of claim 1, wherein the operation of the baler further comprises the steps of prioritizing the first subset of sensors during the first time period, and prioritizing the second subset of sensors during a subsequent time period.

5. The agricultural baler of claim 4, wherein the subsequent time period begins only after the outputs of the first subset of sensors are within a first predetermined range.

6. The agricultural baler of claim 1, wherein the first subset of sensors are configured to output a value directly related to at least one bale parameter chosen from weight, density, shape, length, width, height.

7. The agricultural baler of claim 1, wherein a majority of sensors in the first subset of sensors are located in a rear section of the agricultural baler.

8. The agricultural baler of claim 1, wherein a majority of the sensors in the second subset of sensors are located in a front section of the agricultural baler.

9. The agricultural baler of claim 1, wherein operation of the agricultural baler is controlled by the controller using an algorithm stored in a memory operationally connected to the controller, the algorithm comprising factors for outputs of each of the multiple sensors, and wherein the factors relating to the second subset of sensors increase from the first time period to a subsequent time period.

10. The agricultural baler of claim 1, wherein the controller is operationally connected to a memory storing a set of rules for operating the agricultural baler based on outputs of the multiple sensors, wherein a selection of the set of rules is assigned to the first time period.

\* \* \* \* \*